(12) United States Patent
Thompson et al.

(10) Patent No.: US 6,321,741 B1
(45) Date of Patent: Nov. 27, 2001

(54) COOKING AND BARBECUE GRILL

(76) Inventors: Alan C. Thompson, P.O. Box 218, Miami, TX (US) 79059; Brock A. Thompson, 5816 Middleboro, Amarillo, TX (US) 79109

( * ) Notice: Subject to any disclaimer, the term of this patent is extended or adjusted under 35 U.S.C. 154(b) by 0 days.

(21) Appl. No.: 09/697,569

(22) Filed: Oct. 26, 2000

(51) Int. Cl.$^7$ .................................................. A47J 37/00
(52) U.S. Cl. ..................... 126/25 R; 126/9 R; 126/25 A
(58) Field of Search ............... 126/25 R, 25 A, 126/25 AA, 9 R, 9 B, 29, 30; 99/448, 450; 248/166, 168; 403/101, 102

(56) References Cited

U.S. PATENT DOCUMENTS

| | | | |
|---|---|---|---|
| 1,309,049 | 7/1919 | Syrett | 99/450 |
| 1,556,624 | * 12/1925 | Pavenick | 248/166 |
| 3,498,210 | 3/1970 | O'Toole | 99/357 |
| 3,688,757 | * 9/1972 | Dusek | 126/25 A |
| 3,719,181 | 3/1973 | Porter, Jr. | 126/30 |
| 4,109,567 | 8/1978 | Gage et al. | 99/450 |
| 4,488,535 | * 12/1984 | Johnson | 126/25 A |
| 4,532,912 | 8/1985 | Burnside, III | 126/30 |
| 4,537,392 | * 8/1985 | Defibaugh | 248/168 |
| 4,553,523 | 11/1985 | Stohrer, Jr. | 126/9 B |
| 4,569,327 | 2/1986 | Velten | 126/25 A |
| 4,930,491 | 6/1990 | Purello | 126/332 |
| 4,979,490 | 12/1990 | Nudo et al. | 126/30 |
| 5,437,222 | 8/1995 | Franklin | 99/450 |

FOREIGN PATENT DOCUMENTS

| | | | |
|---|---|---|---|
| 2706274 | * 12/1994 | (FR) | 126/25 R |

* cited by examiner

Primary Examiner—James C. Yeung
(74) Attorney, Agent, or Firm—Thompson & Gustavson L.L.P.

(57) ABSTRACT

A cooking and barbecue grill (10) is disclosed which can be used outdoors or within the fireplace (60) of a home. The grill (10) can be quickly assembled and disassembled with thumbscrews 34. No tools are needed for assembly and disassembly. The grill (10) is formed of a first A-frame member (12), a second A-frame member (14), a top bar (16) and one or more cooking grids (22). The A-frame members (12, 14) have upper and lower angle members (18, 20) at different heights to mount the grid (22). This allows the grid (22) to be positioned at different heights above the fire. The grill (10) is formed of readily available materials including steel rod, steel angle iron and expanded metal grating.

12 Claims, 2 Drawing Sheets

COOKING AND BARBECUE GRILL

TECHNICAL FIELD

This invention relates to cooking or grilling over an open fire.

BACKGROUND OF THE INVENTION

Frequently, on camp outs and picnics, it is desirable to be able to cook or grill food over an open fire. While some camping facilities have a grill available, many times these grills are damaged, or require cleaning. Therefore, it is desirable to transport your own grill for use in the outdoors. However, such grills are often heavy and awkward to manipulate. Further, they tend to be fragile and easily damaged. Therefore, a need exists for an approved grill which has the advantages of ease-of-use, reduced weight and reliability.

SUMMARY OF THE INVENTION

In accordance with one aspect of the present invention, a cooking and barbecue grill is disclosed which has first and second A-frame members. Each of the A-frame members has at least one angle member secured thereto. A top bar extends between the A-frame members and is secured thereto to form the grill. At least one cooking grid is supported between angle members on the A-frame members. A coarse mesh cooking grid and a fine mesh cooking grid can be provided.

In accordance with another aspect of the present invention, the first and second A-frame members can be a continuous rod that is bent to form a first leg, a second leg and an upper connecting section. The A-frame members also have a pipe secured to the upper connecting section, with the pipe having a threaded aperture receiving a threaded member. The top bar passes through the pipe secured to the upper connecting section and is secured thereto by the threaded member. First and second angle irons are secured between the first and second legs of the A-frame member at a first and second distance from the upper connecting section, respectively. One leg of the angle irons extends upwardly to receive the cooking grid.

BRIEF DESCRIPTION OF THE DRAWINGS

A more complete understanding of the invention and its advantages will be apparent from the following Detailed Description when taken in conjunction with the accompanying Drawings, in which.

DETAILED DESCRIPTION

Figure 1:
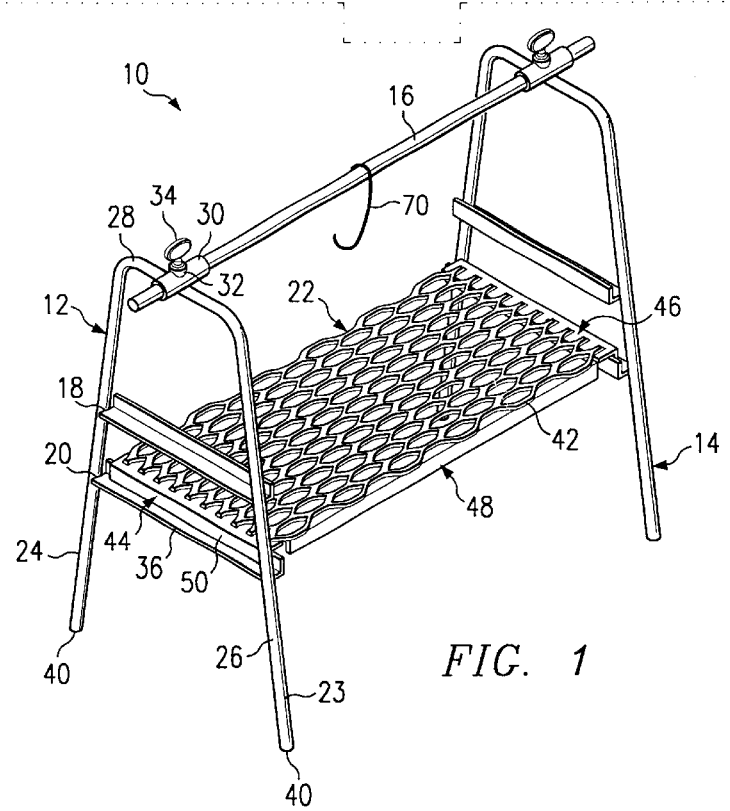
FIG. 1 is a perspective view of a grill forming a first embodiment of the present invention.

Referring now to the drawings, wherein like reference characters designate like or corresponding parts throughout the several views, a cooking and barbecue grill 10 forming a first embodiment of the invention will be described. The grill includes a first A-frame bracket or member 12 and a second A-frame bracket or member 14. A top bar 16 extends between the A-frame members 12 and 14. Each A-frame member 12 and 14 has an upper angle member 18 and a lower angle member 20 to receive a cooking grid 22. The brackets 18 and 20 permit the cooking grid 22 to be positioned at two selected heights above the cooking fire. Of course, more than two brackets can be used if even greater selection of cooking grid height is desired.

Each A-frame member 12 and 14 can be seen to be formed from a continuous rod 23 which is bent in two places to form a first leg 24, a second leg 26 and an upper connecting section 28. Welded on or otherwise fastened to the upper connecting section 28 is a short section of pipe or tubing 30. A threaded boss 32 is secured to the sidewall of the pipe 30 and defines a threaded passage through the sidewall of the pipe opening into the interior of the pipe 30. A threaded thumb screw 34 is received in the threaded boss 32.

Preferably, the first and second legs 24 and 26 have a length of about 24 inches. The length of the upper connecting section 28 is preferably about 9 inches. The included angle X between the upper connecting section 28 and the first and second legs 24 and 26 is preferably about 97 degrees. The included angle can be 90 degrees if the first and second legs 24 and 26 are to be vertical in use, rather than slightly outwardly tilting as shown in the Figures. The rod 23 forming the A-frame members is preferably $5/8$ inch diameter steel rod. The pipe 30 is preferably three-quarter inch(inner) diameter steel pipe or tubing and is about three inches long. The thumbscrew 34 is preferably a $5/16$ in. thumbscrew.

The brackets 18 and 20 can be welded to the first and second legs of the A-frame members 12 and 14 or secured thereto by any other suitable mechanism, such as bolts, screws, clamps and the like. The brackets 18 and 20 are preferably sections of steel angle iron having a first leg 36 and a second leg 38, with the second leg 38 extending vertically upward to receive the ends of the cooking grid 22. Brackets 18 and 20 are preferably one inch by one inch angle iron. The lower angle bracket 20 is preferably welded to the A-frame members 12 and 14 about eleven inches from the bottom ends 40 of the first and second legs 24 and 26 and is about 13 inches long. The upper angle bracket 18 is preferably welded to the A-frame member 12 and 14 about 15 inches from the bottom ends 40 of the first and second legs 24 and 26 and is about 12 inches long.

The top bar 16 is preferably formed by a three-quarter inch diameter steel rod. As can be seen, when the grill 10 is assembled, a portion of the top bar 16 extends through each of the pipes 30 on the A-frame members 12 and 14. The thumbscrews 34 are then tightened against top bar 16 to secure the top bar 16 within the pipes 30 to form a rigid grill structure. It should be noted that the pipes 30 are sufficiently long and sturdy so that the grill 10 can be used even if the threaded thumb screws 34 are not tightened simply by inserting a sufficient length of the top bar 16 into the pipes 30 to support the A-frame members 12 and 14 in the vertical position. The top bar 16 is preferably about 26 inches long. Another advantage is that no tools are needed to assemble and disassemble the grill 10.

The cooking grid 22 is preferably made of expanded metal grating 42 with steel angle iron 44 and 46 at each end thereof. Angle iron 48 can also be secured at one or both sides of the metal grating 42, if desired. The angle iron 44 and 46 preferably have downwardly extending legs 50 which engage either the brackets 18 or 20, depending on the desired level of the cooking grid. Preferably, two cooking grids 22 are supplied with each grill, one having expanded metal grating 42 of fine mesh and the other having expanded metal grating 42 of coarse mesh. The cooking grid 22 having the fine mesh grating is suitable for cooking meats, vegetables and other foods directly on the grid 22. The cooking grid 22 with the coarse metal grating would be preferred to support cooking pots, coffeepots, pans and the like. The angle iron 48, if used, can strengthen the expanded metal grating 42 to resist deformation of the grating 42 due to the weight of the pots, pans, etc. and the heat of the fire and also act as a handle to assist in moving the cooking grid 22. In fact, an actual handle can be mounted on leg 50 of angle iron 48 to assist in moving the cooking grid 22. The handle can be insulated, if desired, to allow the cooking grid 22 to be grasped while heated by the fire. As shown, angle iron 48 is secured along only one side of the grating 42 in the Figures. However, angle iron 48 can be used on both sides of the grating if desired. The downwardly directed leg 50 of the angle iron 48 is preferably cut off at each end of the angle iron to leave gaps 52, as shown in the Figures. This allows the cooking grid 22 to be slid in from either side of the grill 10 along the brackets 18 and 20 to the centered position(as shown in FIG. 1) for use.

Alternatively, the leg 50 of the angle iron 48 can extend the full length of the angle iron 48, which will require the cooking grid 22 to be slid in the grill 10 starting with the side opposite the angle iron 48. In this design, the leg 50 serves as a stop to inserting the cooking grid 22 beyond the desired position as the leg 50 of angle iron 48 would come into contact with the ends of the legs 50 of the brackets 18 and 20, and also as a safety feature to prevent the cooking grid 22 from accidentally being slid off of the grill 10 in the insertion direction. Of course, the cooking grid 22 can simply be inserted between A-frame member 12 and 14 above the bracket 18 or 20 to be used, and the cooking grid 22 lowered onto the selected bracket 18 or 20. When angle irons 48 are used on both sides of the cooking grid 22 with legs 50 extending the full length of the angle irons 48, it would be necessary to use this technique to set the cooking grid 22 on the selected brackets 18 or 20. By use of full length legs 50 on both angle irons 48, it would not be possible to slide the cooking grid 22 out from the grill 10 in either horizontal direction, and this design may be used when safety considerations are more critical.

Preferably, the cooking grid is about 20 inches long from angle iron 44 to angle iron 46 and about 12 inches wide. The angle iron 44 and 46 is preferably one inch by one inch angle. For the fine mesh cooking grid 22, the metal grating 42 is preferably ¾ inch flat expanded metal while the coarse mesh cooking grid metal grating is 1" raised expanded metal.

Figure 3:
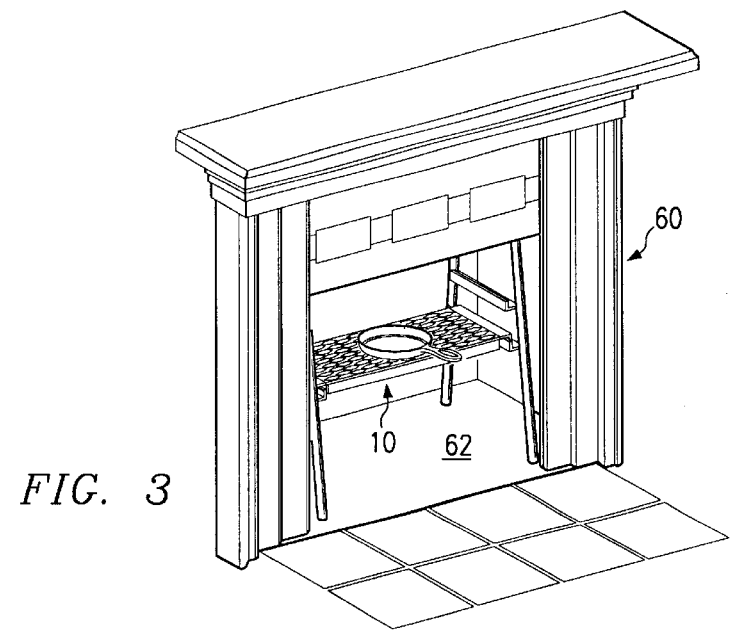
FIG. 3 illustrates the grill used in a home fireplace.
Figure 2:
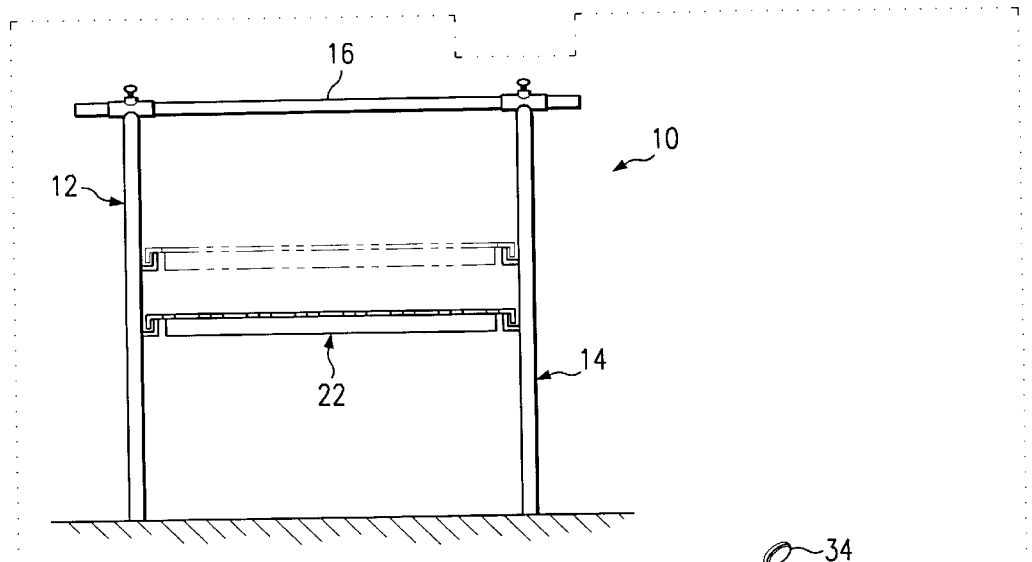
FIG. 2 is a front view of the grill.
Figure 4:
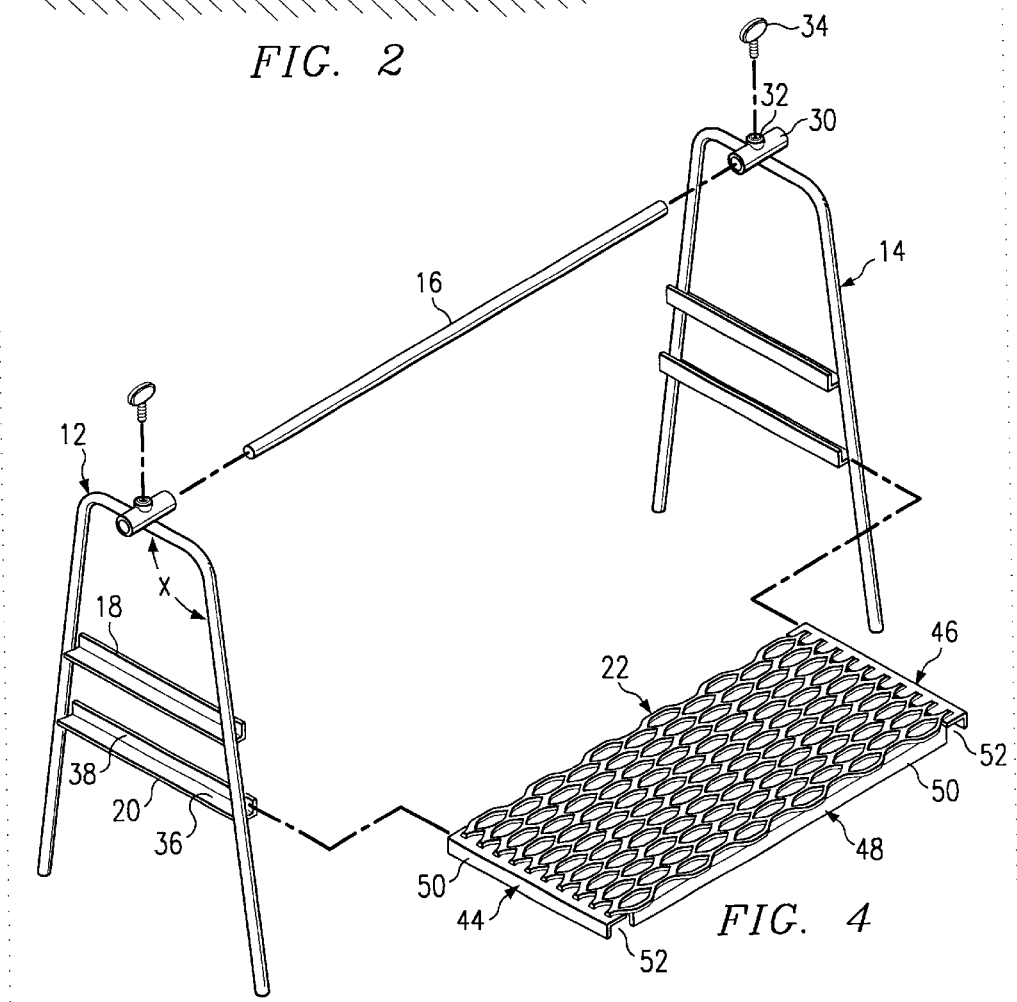
FIG. 4 is exploded view of the grill of FIG. 1.

As can be understood, the cooking and barbecue grill 10 can be readily assembled and disassembled. As a result, the grill 10 can be used within the interior fireplace 60 within a home as illustrated in FIG. 3. Thus, the grill 10 can be used as an emergency cooking grill should the stove in the home fail. Of course, the grill 10 can be used in the fireplace 60 for cooking in nonemergency situations is well. When disassembled, the pieces of the grill 10 can be easily passed through the opening in the fireplace 60 and assembled within the firebox 62 of the fireplace 60.

The grill 10 is formed of commonly available materials and can be easily constructed. Thus, it is inexpensive to manufacture. Further, the materials from which it is formed, preferably steel rod, angle iron and expanded metal grating, are extremely durable and would be expected to last indefinitely. The grill 10 can also be used without any cooking grid 22 by suspending hooks 70 from the top bar 16 to support pots, pans or other cooking implements above the fire. When so used, the A-frame members 12 and 14 can be positioned virtually anywhere along the top bar 16, and the grill 10 can be fit into tight spaces or adjusted as is necessary for a particular location.

While a single embodiment of the present invention has been illustrated in the accompanying drawings and described in the foregoing Detailed Description, it will be understood that the invention is not limited to the embodiment disclosed, but is capable of numerous rearrangements, modifications and substitutions of parts and elements without departing from the scope and spirit of the invention.

What is claimed is:

1. A cooking and barbecue grill, comprising:
    a first A-frame member having a continuous rod forming a first leg, a second leg and an upper connecting section, the first A-frame member having a pipe secured to the upper connecting section, the pipe having a threaded aperture through the wall thereof, and a threaded member threaded into the threaded aperture in the pipe, said first A-frame member having a first angle member secured between the first leg and second leg at a first distance from the upper connecting section and a second angle member secured between the first leg and second leg at a second distance from the upper connecting section;
    a second A-frame member having a continuous rod forming a first leg, a second leg and upper connecting section, the second A-frame member having a pipe secured to the upper connecting section, the pipe having a threaded aperture through the wall thereof, and a threaded member threaded into the threaded aperture in the pipe, said second A-frame member having a first angle member secured between the first leg and second leg at a first distance from the upper connecting section and a second angle member secured between the first leg and second leg at a second distance from the upper connecting section;
    a top bar extending through the pipes on said first and second A-frame members and secured to said first and second A-frame members by the threaded member in the pipes of said first and second A-frame members; and
    at least one cooking grid, said cooking grid including an expanded metal grating, a first angle member secured at one edge of the expanded metal grating and a second angle member secured at the opposite edge of the expanded metal grating, said first angle member engaging one of said angle members on said first A-frame member and said second angle member engaging none of said angle members on said second A-frame member.

2. The cooking and barbecue grill of claim 1, wherein the threaded members are threaded thumbscrews.

3. The cooking and barbecue grill of claim 1 wherein the first and second A-frame members are formed of steel rod and steel angle irons, said top bar is formed of steel rod and said cooking grid is formed of expanded metal grating and steel angle iron.

4. A cooking and barbecue grill, comprising:
    a first A-frame member having a continuous member forming a first leg, a second leg and an upper connecting section, the first A-frame member having a receiving member secured to the upper connecting section, the receiving member having an aperture, and a locking member in the aperture in the receiving member, said first A-frame member having a first grating support member secured between the first leg and second leg at a first distance from the upper connecting section and a second grating support member secured between the first leg and second leg at a second distance from the upper connecting section;

a second A-frame member having a continuous member forming a first leg, a second leg and an upper connecting section, the second A-frame member having a receiving member secured to the upper connecting section, the receiving member having an aperture, and a locking member in the aperture in the receiving member, said second A-frame member having a first grating support member secured between the first leg and second leg at a first distance from the upper connecting section and a second grating support member secured between the first leg and second leg at a second distance from the upper connecting section;

a top element extending into the receiving members on said first and second A-frame members and secured to said first and second A-frame members by the locking member in the receiving members of said first and second A-frame members; and at least one cooking grid, said cooking grid including a heat resistant grating, a first grating support member secured at one edge of the heat resistant grating and a second grating support member secured at the opposite edge of the heat resistant grating, said first grating support member engaging one of said grating support members on said first A-frame member and said second grating support member engaging one of said grating support members on said second A-frame member.

5. The cooking and barbecue grill of claim 4 wherein the locking member is a threaded thumbscrew.

6. The cooking and barbecue grill of claim 4 wherein the cooking grid is formed from an expanded metal grating.

7. The cooking and barbecue grill of claim 4 wherein the receiving member includes a pipe, the pipe receiving a portion of the top element, the pipe having a threaded portion, the locking member threadably engaged with the threaded portion and tightened against the top element to secure the top element to the A-frame member.

8. The cooking and barbecue grill of claim 4 wherein the continuous member of the first and second A-frame members is made of steel rod and the first and second grating support members of the first and second A-frame members are formed of steel angle iron.

9. The cooking and barbecue grill of claim 4 further comprising a second cooking grid, each of said cooking grids having a mesh, the second cooking grid having a coarse mesh compared to the cooking grid.

10. The cooking and barbecue grill of claim 4 wherein the upper connecting section and the first and second legs of the first and second A-frame members define an included angle, the included angle being about 97 degrees.

11. The cooking and barbecue grill of claim 4 wherein a portion of the top element extends through the receiving members of the first and second A-frame members to form the cooking and barbecue grill without the need for the locking members.

12. The cooking and barbecue grill of claim 4 wherein the heat resistant grating is formed of an expanded metal grating and at least one angle iron to strengthen the expanded metal grating, the first and second grating support members also being angle iron.

* * * * *